Feb. 19, 1963 N. MILLERON ET AL 3,077,712
VACUUM TRAP AND VALVE COMBINATION
Filed July 14, 1961

INVENTORS
NORMAN MILLERON
BY LEONARD L. LEVENSON

ATTORNEY

United States Patent Office 3,077,712
Patented Feb. 19, 1963

3,077,712
VACUUM TRAP AND VALVE COMBINATION
Norman Milleron, Berkeley, and Leonard L. Levenson, Livermore, Calif., assignors to the United States of America as represented by the United States Atomic Energy Commission
Filed July 14, 1961, Ser. No. 124,244
12 Claims. (Cl. 55—208)

The present invention relates in general to traps for vacuum systems and, more particularly, to an improved adsorption vacuum trap and valve combination suitable for use in large, ultra-high vacuum systems.

In creating a vacuum in a chamber, diffusion pumps have proved to offer the highest pumping speeds at the lowest pressures attainable. To obtain the maximum pumping speed for any particular diffusion pump, the pump must be placed in direct communication with the chamber to be evacuated. But, in such a position, the ultimate obtainable vacuum is seriously limited by a backstreaming of vaporized pump-fluid molecules. Hence, in such a position, the highest attainable vacuum is limited to the vapor pressure of the pump fluid at the temperature of the chamber undergoing evacuation.

To alleviate this backstreaming in the vacuum system, isolation or cold traps and "optically dense" baffles have been designed and fabricated to be placed between the diffusion pump and the chamber to be evacuated.

The various traps and baffles, and combinations thereof, greatly reduce molecular flow conductance and thus reduce the speed with which a chamber may be evacuated.

It is desirable to maximize the pumping speeds of vacuum systems having traps, valves, and baffles while reducing contamination coming from the pumping means to an acceptable amount.

One measure of the molecular flow conductance through a geometry is called the transmission probability or Clausing factor P. This transmission probability has not, up to now, exceeded .15 for conventional trap, valve, and baffle systems used in conjunction with large vacuum systems. In addition, many other disadvantages are encountered when employing these conventional trapping designs in large, ultra-high vacuum systems. For instance, many isolation traps have a restrictive design not readily scaled to larger dimensions. In addition to low conductance, cold traps of the conventional finger-type design fail principally in that they do not inhibit surface migration along warm walls.

The present invention is an isolation trap and valve having a high conductance wherein the transmission probability, P, can be made as high as .45, and wherein the partial pressure of pump-fluid vapor in the vacuum chamber is at least 100 times lower than its vapor pressure. In certain applications the present invention also alleviates the need for a baffle between the pump and the chamber to be evacuated. Another important feature of this invention is its use as a combination trap and valve. Two separate components are now combined into one, which is not only advantageous, but an essential requirement for optimum system pumping speed. The traps of this invention can be readily scaled so that they can be used with large diffusion pumps, yet maintain their high trapping efficiency. These vacuum traps are furthermore compatible with repeated bake-out procedures, which is essential to the attainment of pressures in the ultra-high vacuum range.

Briefly, the present invention comprises a vacuum trap and valve combination wherein the valve, when opened, blocks the "line-of-sight" between the inlet and outlet openings, and wherein there is a large flow path between the open valve and the side walls of the trap. The side walls of the trap and the side of the valve facing the inlet opening for most applications, are covered with an impurity adsorbent, such as zeolite or activated alumina.

Hence, it is a primary object of this invention to provide an improved vacuum trap having a high conductance in conjunction with a high trapping efficiency for backstreaming pump fluid.

Another object of this invention is to provide a vacuum trap having optimum pumping efficiency with respect to the vacuum chamber wall area available for pumping.

A further object of this invention is to provide a vacuum trap which alleviates the necessity of a baffle between a diffusion pump and a chamber to be evacuated.

One other object of the invention is to provide a vacuum trap and valve combination having as high a conductance as any possible trap alone.

A still further object of this invention is to provide a vacuum trap and valve combination which is compatible with repeated bake-out procedures.

A final object of this invention is to provide a trap and valve combination which can be readily scaled to be used in combination with large diffusion pumps without loss of conductance or trapping efficiency.

For a better understanding of the present invention, together with further objects and advantages, reference is made to the following descriptions and mode of operation of specific embodiments of the invention taken in conjunction with the accompanying drawings. No limitations, though, are intended or are to be inferred from these specific embodiments, reference being made to the appended claims for precise delineation of the invention.

Figure 1:
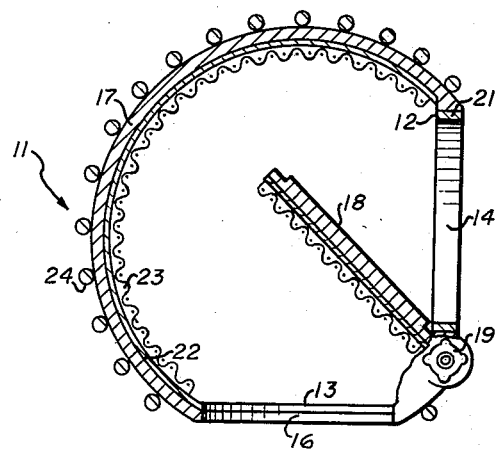
FIGURE 1 is a schematic plan view of an elbow trap as a specific embodiment of the invention.

With reference now to FIGURE 1, there is shown a spheroidal, cylindrical, or cubical body 11 intersected by a first plane surface 12 and by a second plane surface 13 which is at right angles and juxtaposed to the first plane surface 12. The first plane surface 12 has a gas inlet opening 14, the combination thereby forming an elbowlike duct. The intake opening 14 in plane surface 12 is hermetically sealed to a chamber (not shown) to be evacuated. Such connection is accomplished by welding the cylindrical body 11 to the chambers to be evacuated at a position circumferentially about the exterior to inlet opening 14. Similarly, second plane surface 13 is provided with an outlet opening 16 to a diffusion pump (not shown) and is connected thereto in the same manner as opening 14 is connected to the evacuation chamber.

Walls 17 of the elbow trap are fabricated of suitable heat-conducting material, such as aluminum, steel, stainless steel, or other metals. A metallic valve gate 18 is rotatably mounted in the interior of body 11 at/or near the right angle corner of the elbow, the valve surface being transverse to the duct axis. A suitable pivot mechanism 19, to control rotation of the gate 18 about a peripheral axis, connects through appropriate vacuum seals from the outside of the body 11 to an edge of valve 18 in the interior of the trap. The shape and size of valve 18 is determined by the shape of the intake opening 14, and furthermore depends on the method chosen to close the intake opening 14. This specific embodiment, for instance, makes use of an inflatable-deflatable gasket 21 disposed along the interior mating surface of opening 14. Hence, the diameter of the valve is smaller by an amount such that an hermetic fit is insured when both valve 18 and gasket 21 are mated inside the intake opening 14. As illustrated, the diameter of the spheroidal, cylindrical, or cubical body 11 is substantially larger than the diameter of the gate 18 to allow sufficient space between the gate 18 and the body wall 17 for the passage of gas from the inlet to the outlet openings. A gas adsorbent material 22, i.e., zeolite or activated alumina, is held in place on the interior surface of the valve 18 facing or nearest to the outlet opening, by a suitable means, such as wire mesh 23. For many applications, where the chamber walls are cooled, condensation of the back-migrating pumping oils is accomplished and is sufficient to scavenge such oils. Means, such as electrical heating coils 24 affixed to the outer surface of trap 11, are provided to heat the gas adsorbent material 22 to bake-out temperatures. The coils 24 heat that gas adsorbent material 22 in contact with the body wall 17 by conduction through the wall 17. The gas adsorbent material 22 on valve 18 is heated by radiation from the walls 17.

Figure 2:
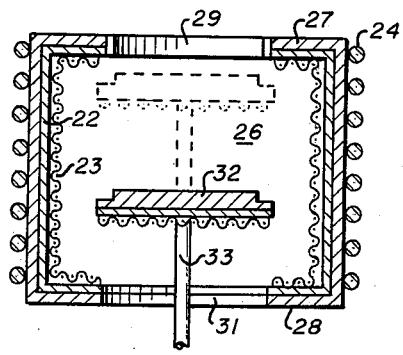
FIGURE 2 is a cross-sectional view of a cylinder trap as another embodiment of the invention.

Now referring to FIGURE 2, there is shown a second embodiment of the invention comprising cylindrical body 26 intersected by a first plane surface 27 and by a second plane surface 28 opposite and parallel to the first plane surface 27. Again, the first plane surface has an intake opening 29, and the second plane surface an outlet opening 31, both openings being situated symmetrically about the longitudinal axis of the cylindrical body portion and forming, thereby, a cylindrical duct. A metallic valve gate 32 is positioned between the intake and exhaust openings, as illustrated. Means to support and move the valve translationally into hermetic closing contact with the walls of the intake opening 29 are provided. Such means being, for instance, a screw rod 33 attached to the center of the gate 32 and extending along the axis of cylindrical body 26, through the outlet opening 31, and through appropriate vacuum seal (not shown) to a screw drive or hydraulic activator mechanism. As in FIGURE 1, the particular size and shape of the gate 32 depends on the shape of the intake opening 29 and the method chosen for closing same.

For one particular embodiment of the cylindrical trap, cost and efficiency considerations help to establish the following dimensions. The ratio of the radius of the cylinder to the radius of the intake opening is equal to 1.5. The length of the cylinder is 2 to 4 times the radius of the intake opening. The radius of the outlet opening can be as large as the radius of the cylinder, providing no line-of-sight exists between the outlet and inlet openings past the disc valve. In this case, the gate is in its open position at an axial distance about one-fourth the length of the cylinder from the intake opening. When intake and outlet openings are equal in radius, the gate is positioned at an axial distance of one-half the length of the cylinder from the intake opening.

As illustrated in the drawings, the valve gates prevent only line-of-sight between the exhaust and intake openings. Any vapor molecules backstreaming from the upper oil jets of the exhausting diffusion pump must therefore collide with the valve gate barrier or with walls. Vapor molecules which creep along the upper walls of the diffusion pump will be adsorbed by the impurity adsorbent on the interior wall of the trap. Likewise, all vapor molecules emitted from the upper jets of the diffusion pump toward the clean vacuum in streaming angles such that they would miss the valve barrier must then collide with the interior wall where they too will be adsorbed. In the case of traps using cold surfaces only, any vapor molecules entering the trap are condensed to solid or liquid.

At the reduced pressures generally encountered in ultra-high vacuum systems (less than $10^{-8}$ mm. Hg), the mean free path is quite large, and the probability is very low indeed that the vapor molecules may bypass the valve barrier by molecule to molecule scattering and enter the clean vacuum. Conversely, however, due to the relatively large passageway between the valve barriers and the interior wall surfaces, the conductance for the gas to be pumped remains optimum.

The closed position of the valve is achieved by rotating or translating, respectively, the valve structure into the inlet opening and subsequently inflating the gaskets. The vacuum chamber can thereby be exhausted by a forepump while the diffusion pump is brought up to operating conditions.

Alternately, after a period of pumping and when the saturation point of the respective adsorbent is reached, the valve is closed, as described above, and the wall surfaces of the trap are heated to bake-out temperatures by heating means as provided. Thus, the diffusion pump continues to operate while simultaneously pumping away the desorbed vapors and gases.

Other modifications of the subject invention are contemplated. For instance, instead of a moveable valve, a stationary, line-of-sight, obstructing means may be rigidly attached in the best optically dense position within a vacuum trap. Of course, in line with the invention, gas adsorbent material would cover the interior wall of the trap and all portions of the obstructing means facing the outlet opening. There would also be a large transmission space between the obstructing means and the walls of the trap.

In another embodiment of the present invention, the gas adsorbent material is cooled by enclosing the exterior walls of the trap within a heat radiation shielding jacket through which coolant is passed. This cooling helps the adsorbing qualities of many gas adsorbing materials. Before the gas adsorbing material is degassed, though, the coolant is removed to facilitate heating of the material. Furthermore, the present invention may be used without gas absorbent materials in cases where other mechanisms exist for obtaining ultra-high vacuum, such as with very low vapor pressure pump fluids which can be effectively condensed to liquids on the trap walls at temperatures at or below 20° C.

Some of the many possible embodiments of the subject invention have been hereinbefore described and illustrated with respect to specific structure and mode of operation; however, same are only examples and in no way should be taken as limiting the scope of the invention which is precisely delineated in the following claims.

What is claimed is:

1. A vacuum trap and valve combination comprising a body shell having an interior surface and having inlet and outlet openings adapted for connection into a vacuum system, a valve gate retained within said body shell having a surface area facing the outlet opening, means to close and open said valve gate, said valve gate having a size and shape to closely fit within the inlet opening when closed and to obstruct line-of-sight between the inlet and outlet openings when opened while allowing flow path space between said valve gate and said interior surface of the body shell, means to effect a vacuum seal between said valve gate and the inlet opening, gas adsorbent material covering the entire inner surface of said body shell and said surface of the valve gate, and means to periodically heat said gas adsorbent material to bake-out temperatures.

2. A vacuum trap and valve combination as defined by claim 1 wherein cooling means to cool said gas adsorbent material is provided.

3. A vacuum trap and valve combination as defined in claim 1 wherein said gas adsorbent material is activated alumina.

4. A vacuum trap and valve combination as defined in claim 1 wherein said gas adsorbent material is zeolite.

5. A vacuum trap and valve combination comprising a cylindrical body shell having an interior surface and having inlet and outlet openings at the extremities thereof adapted to connect said trap and valve combination into a vacuum system and wherein the diameter of said cylindrical body shell is substantially larger than the diameter of said inlet opening, a valve gate retained within said cylindrical body shell having a surface area facing the outlet opening, means for translationally moving said valve gate into a closed position within said inlet opening and into an open position within said cylindrical body, said voltage gate having a size and shape to closely fit within the inlet opening when closed and to obstruct a line-of-sight between the inlet and outlet openings when in the open position, means for effecting a vacuum seal between said inlet opening and said valve gate gas adsorbent material covering the entire inner surface of said cylindrical body shell and the said surface area of the valve gate, and means for periodically heating said gas adsorbent material to bake-out temperatures.

6. A vacuum trap and valve combination comprising a spheroidal body shell having an interior surface and having an inlet opening and an outlet opening substantially at right angles to each other and forming thereby an elbow-like duct wherein the diameter of the spheroidal body shell is substantially larger than the diameter of the inlet opening, a valve gate rotatably mounted within said spheroidal body shell and having a surface area facing said inlet opening, means to rotate said valve gate about a peripheral axis between the inlet and outlet openings to a closed position within the inlet opening and to an open position within the spheriodal body shell, said valve gate having a size and shape to closely fit within the inlet opening when in the closed position and to obstruct line-of-sight between the inlet and outlet openings when open, means to effect a vacuum seal between said valve gate and said inlet opening, gas adsorbent material covering the entire interior surface of said body shell and the said surface of said valve gate, and means to periodically heat said gas adsorbent material to bake-out temperatures.

7. A vacuum trap comprising a body shell with an interior surface and having inlet and outlet openings adapted to connect said vacuum trap into a vacuum system, an obstructing gate having a surface area facing the outlet opening mounted within said body shell, said obstructing gate having a size and shape to obstruct line-of-sight between the inlet and outlet openings while maintaining gas transmission space between said obstructing gate and said interior surface of said body shell, gas adsorbent material covering said interior surface of the body shell and said surface area of the obstructing means, and heating means to periodically heat said gas adsorbent material to bakeout temperature.

8. A vacuum trap as defined in claim 7 wherein cooling means to cool said gas adsorbent material are provided.

9. A vacuum trap as defined in claim 7 wherein said gas adsorbent material is activated alumina.

10. A vacuum trap as defined in claim 7 wherein said gas adsorbent material is zeolite.

11. A vacuum trap comprising a cylindrical body shell having an interior surface and having inlet and outlet openings at the extremities thereof, an obstructing gate having a surface area facing the outlet opening mounted within said cylindrical body shell, said obstructing gate having a size and shape to obstruct line-of-sight between the inlet and outlet openings while maintaining gas transmission space between said obstructing gate and said interior surface of said cylindrical body shell, gas adsorbent material secured to the entire interior surface of said cylindrical body shell and said surface of the obstructing gate, and means to periodically heat said gas adsorbent material to bake-out temperature.

12. A vacuum trap comprising a spheroidal body shell having an interior surface and having an inlet opening and an outlet opening substantially at right angles to each other to form thereby an elbow-like duct, said inlet and outlet openings adapted to connect into a vacuum system, an obstructing gate having surface area facing the outlet opening mounted within said spheroidal body shell, said obstructing means having a size and shape to obstruct line-of-sight between the inlet and outlet openings while maintaining gas transmission space between said obstructing means and said interior surface of the body shell, gas adsorbent material secured to the interior surface of said body shell and said surface area of the gate, and means to periodically heat said gas adsorbent material to bake-out temperature.

References Cited in the file of this patent
UNITED STATES PATENTS

| | | |
|---|---|---|
| 2,465,229 | Hipple | Mar. 22, 1949 |
| 2,831,549 | Alpert | Apr. 22, 1958 |